Sept. 13, 1960  A. A. LACHANCE ET AL  2,952,470
INFANT'S FOLDING SEAT FOR GROCERY CARTS
Filed Nov. 21, 1958  2 Sheets-Sheet 1
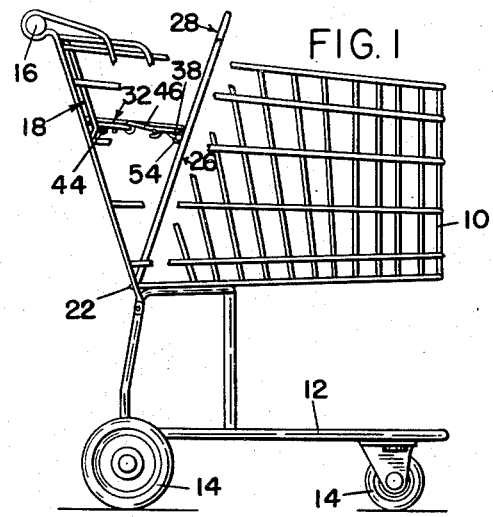
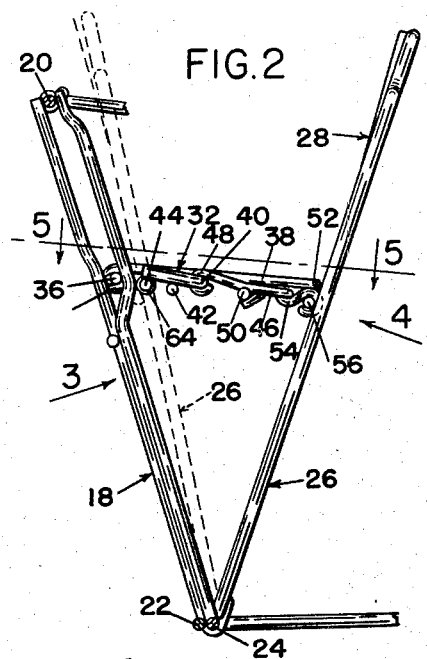
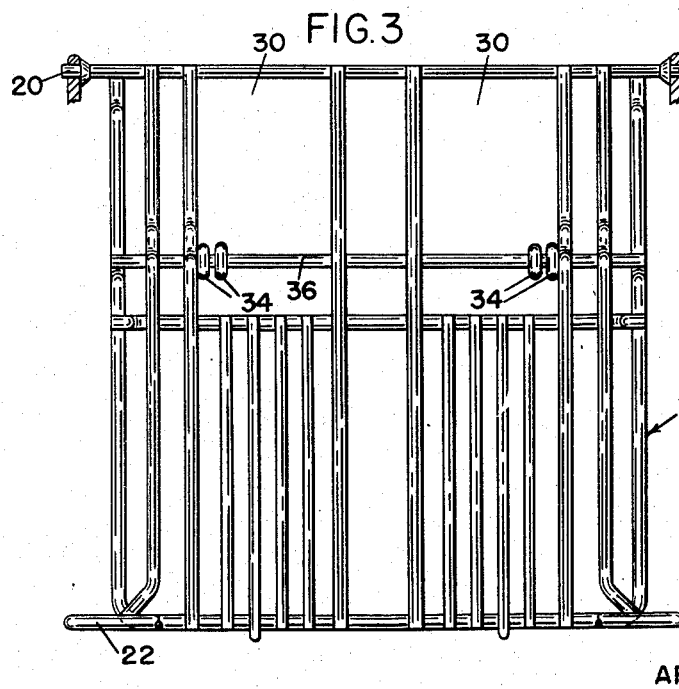
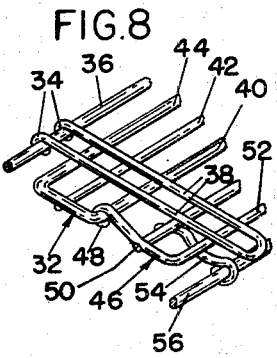
INVENTORS
ARMAND A. LACHANCE
STANLEY CIBOROWSKI
ATTORNEY Sept. 13, 1960 A. A. LACHANCE ET AL 2,952,470
INFANT'S FOLDING SEAT FOR GROCERY CARTS
Filed Nov. 21, 1958 2 Sheets-Sheet 2
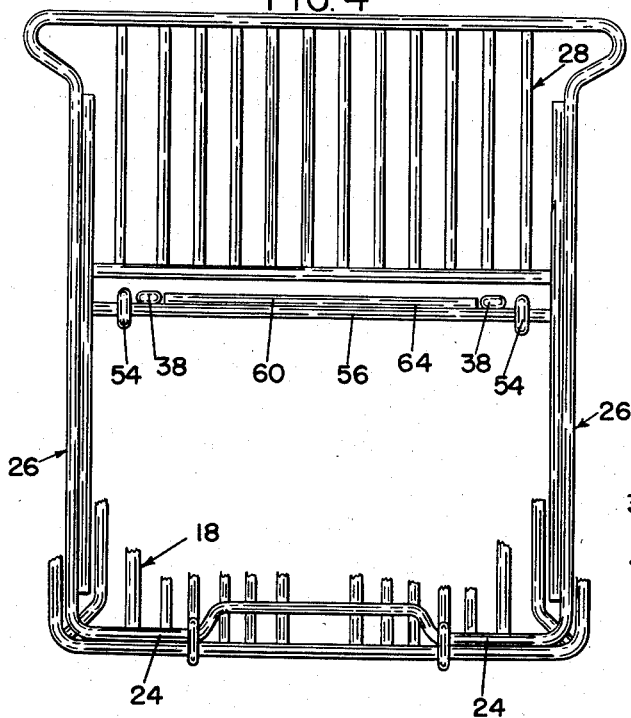
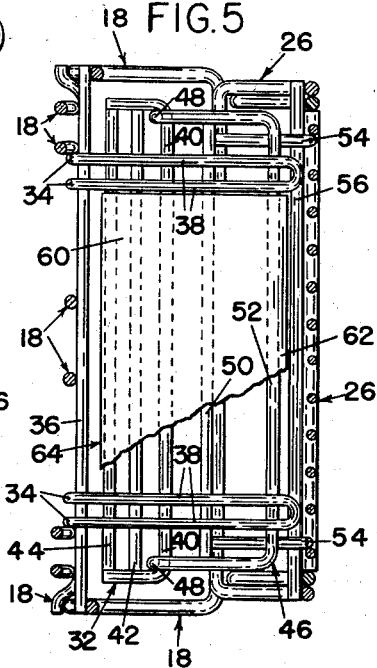
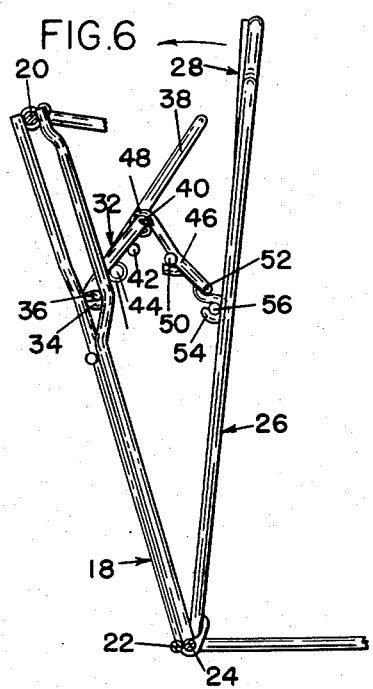
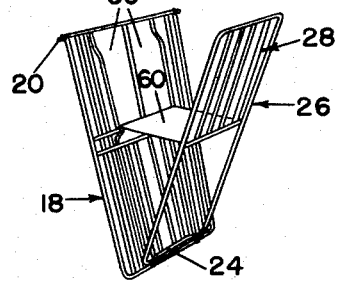
INVENTORS
ARMAND A. LACHANCE
STANLEY CIBOROWSKI
ATTORNEY

United States Patent Office 2,952,470
Patented Sept. 13, 1960

2,952,470
INFANT'S FOLDING SEAT FOR GROCERY CARTS

Armand A. Lachance, % American Metal Products Company, Southbridge St., Auburn, Mass., and Stanley Ciborowski, Worcester, Mass.; said Ciborowski assignor to said Lachance Filed Nov. 21, 1958, Ser. No. 775,546

4 Claims. (Cl. 280—33.99)

This invention relates to a new and improved nesting grocery cart or the like provided with an improved folding seat construction for infants. Children's folding seats are well known in the art, and this invention represents an improvement over the prior art and includes a swinging gate having the folding seat thereon and movable therewith to allow for the nesting of one cart with respect to another, the infant's folding seat comprising a two-part folding seat member operatively connected to said swinging gate and to an auxiliary member within the container portion of the cart and pivoted to the gate, such that the device is completely foldable out of the way for use of the cart without the use of the child's seat, or alternatively the child's seat may be easily extended at a moment's notice for disposition of the child on the seat, said swinging gate being provided with apertures for extension of the legs of the child therethrough and the auxiliary member providing a backrest for the child who rides backwards in the cart, facing the operator thereof.

Further objects of the invention include the provision of a new and improved construction whereby the said swinging gate upon being engaged by the forward portion of an adjacent cart which is desired to be nested therewithin, swings on its pivots and at the same time causes a folding action of the said auxiliary member and the seat portion itself; and the provision of a folding seat construction as aforesaid including a two-part knuckle construction which automatically folds upon motion of the auxiliary member toward the swinging gate either when this is accomplished directly manually or when the succeeding cart is moved to engage the swinging gate in order to nest.

Another object of the present invention includes the provision of an improvement in the construction of folding seats for nesting grocery carts wherein the total capacity of the container portion of the cart is increased over those of the prior art without any corresponding decrease in the size of the child's folding chair or seat, this being accomplished in part by reason of the knuckle construction and the fact that the auxiliary swinging member mounted on the gate is a backrest member, the knuckle construction providing its own integral means for holding the knuckle in more or less horizontal extended condition without any sliding engagement of any parts of the seat construction, one with respect to another, whereby the folding action of the seat is smoother and there is no possibility of interference between one sliding member and another, as is encountered in the prior art patented constructions.

Another object of the invention resides in the provision of a seat cover flap which is manually alternatively positioned to cover the leg holes in the rear swinging gate aforesaid, so that packages may be carried in the seat itself; or the flap may be flipped down to provide a smooth, stable and comfortable supporting surface for the infant.

A still further object of the invention resides in the provision of a folding seat of the class described which comprises a pair of inter-connected, articulated, seat-forming parts, each of which is pivoted to a respective portion of the swinging end gate and the auxiliary member connected thereto, together with means which forms a part of the pivot connection to one of said members, providing for maintaining the seat in its extended condition substantially horizontal, but at the same time being so constructed and arranged as to fail to interfere in any way with the folding action of the knuckle seat construction so that the same may be folded manually merely by grasping the auxiliary portion which forms the backrest of the seat and moving it toward the swinging gate, or alternatively, by moving the swinging gate upwardly as is the natural result of engaging the same from the rear by means of the forward end of the container portion of the succeeding grocery cart which is to be nested with the container of the cart having the seat.

The invention further relates to arrangements and combinations of parts which will be hereinafter described and more particularly set forth in the appended claims.

Reference is to be had to the accompanying drawings, in which—

Fig. 1 is a view in side elevation of a grocery cart embodying the present invention, parts being broken away;

Fig. 2 is a view on an enlarged scale illustrating the action of the seat construction;

Fig. 3 is a view in elevation, looking in the direction of arrow 3 in Fig. 2;

Fig. 4 is a view in elevation from the opposite side of the folding seat construction, looking in the direction of arrow 4 in Fig. 2;

Fig. 5 is a section on line 5—5 of Fig. 2;

Fig. 6 is a view illustrating the folding action of the seat;

Fig. 7 is a diagrammatic view in perspective illustrating the seat in open condition; and Fig. 8 is a fragmentary perspective view of the folding seat construction, parts being broken away.

In carrying out the present invention, the same is shown as applied to the substantially conventional swinging gate of a grocery cart such as is extensively used in super markets. The entire rear gate of the grocery cart swings up in order to allow nesting of similar type grocery carts to conserve space, as is well known in the industry, and the usual child's folding seat comprises an auxiliary member pivoted at the lower end of the swinging gate, the swinging gate being pivoted at its upper end to the cart sides so that the folding seat appears in a substantial V form when open, the child sitting on a folding member extending between the gate and the auxiliary member. This is shown in Figs. 1 and 2 wherein the cart may comprise for instance a container portion 10, a platform 12, wheels 14, a fixed pusher handle 16, and a swinging rear gate member generally indicated at 18. This swinging gate member is pivoted or hinged at its upper end as for instance at 20 in Fig. 2, and may move upwardly in a counter-clockwise direction in Fig. 2 to free the rear portion of the cart for the purpose of allowing entrance of the front portion of the container of another cart for nesting purposes as is well recognized in the art. The swinging gate 18 may have some kind of stop such as for instance at 22 which locates the same in downward operative position thereof, and in this condition the cart is to be operated for the intended purpose of carrying groceries.

Hingedly or swingably mounted at the lower end of gate 18 as at 24, there is an auxiliary member generally indicated at 26. This member is almost as wide as the gate itself and its only connection to the cart is at the hinge portion 24 thereof, and it will be seen that member 26 therefore swings with the gate above described in both clockwise and counter-clockwise movements thereof. In addition, auxiliary member 26 is pivotable between its dotted line position in Fig. 2 and its solid line position therein. In the dotted line position, the child's seat is folded and is out of operation, whereas in solid line position of the swinging member 26, the seat is extended, and ready for occupancy by the child who uses the upper portion of member 26 as for instance as generally indicated at 28 as a backrest, and the knees and lower legs and feet of the infant will then extend through the openings indicated at 30, 30 in Fig. 3, these openings appearing in the swinging gate member 18.

The supporting surface for the child in this invention is provided by a two-part knuckle member and a comparison of Figs. 2 and 6 will serve to show the operation thereof. Instead of being a single seat member which is connected to either the gate 18 or the auxiliary portion thereof 26 and slides on the other, the new seat is divided along a line midway of and parallel to the gate 18 and the auxiliary member 26, the two parts being articulated and each part is also pivotally secured with relation to said members 18 and 26 as will become more apparent hereinafter.

The seat member is preferably made of wire and comprises a first rectangular member generally indicated at 32 which is pivoted in some manner as by hooks 34 surrounding an elongated wire member 36 which extends from side-to-side of member 18 and forms a part thereof (see particularly Fig. 3). The hook members 34 are preferably double as shown in Fig. 3 and extend in elongated loops 38, 38 (see Fig. 5). Loops 38 are secured to the rectangular member 32 and in effect form a single swinging member therewith.

The seat portion member 32 is provided with an edge wire as at 40 extending from end-to-end thereof, an intermediate wire 42, and an outer longitudinal wire 44. The other portion of the seat includes a rectangular member which is generally indicated at 46 having hooks 48 hooking over longitudinal edge wire 40 at each end thereof in order to pivotally secure the two parts of the seat as at 32 and 36 together. The seat portion 46 has no forward wire comparable to the one at 40 in seat member 32, but it is provided with a central wire at 50 and an inner wire at 52 to which are secured hook members 54 hooking around a longitudinal wire 56 that is a frame member for auxiliary member 26. This construction inter-pivots seat member 46 with the auxiliary member 26. Members 32 and 46 formed a "knuckle."

When this knuckle linkage is extended as shown in Fig. 2, the elongated loop members 38 extend in superimposed relationship on the part of the seat which is indicated at 46 and are adapted to hold the members in substantially horizontally extended condition as shown in full lines in Fig. 2, so that there is no collapse of the seat member below the generally horizontal position thereof.

Also, however, the knuckle members 32 and 46 are maintained by the loop members 38 in a relationship whereby the seat members will fold upwardly as indicated in Fig. 6 merely upon pivoting of the auxiliary member 26 in the direction of the arrow in Fig. 6 to folded condition thereof. It is not necessary for the operator to make any action whatsoever to initiate this folding action which results from the fact that the members 32 and 46 are held in a position which is slightly offset from a straight line position through the axes of the respective wires 36, 40, and 56 so that it is a simple matter to fold the seat from the solid to the dotted line position in Fig. 2. When the entire device is so folded, the entire folded seat and gate 18 is easily swung up to provide for the nesting of the cart in a well known manner.

If the seat is open in the extended relationship thereof, as shown in solid lines in Fig. 2, and the gate 18 is engaged from the rear by the forward portion of the container 10 of another grocery cart and thus swung up, the folding action of the knuckle members 32 and 46 is completely automatic and these members will then fold to the dotted line position, taking with them at the same time the auxiliary member 26 which assists this action due to the fact that it inherently has a considerable amount of weight as compared to the seat members themselves.

In addition to the above, it will be noted that the auxiliary member 26 in Fig. 7 is completely open below the seat so that storage space in the container 10 is not sacrificed in any way, and the triangular space defined by the knuckle members 32 and 46 and the portions of the gate 18 and auxiliary member 26 below this seat, is still available for storage purposes in the grocery store, thus providing a considerable improvement over the prior art infants' seats in which this space is lost.

In addition to the above, the longitudinal wire member 44 is provided with a sheet metal seat member which is indicated at 60, see particularly Figs. 5 and 7. This member has a completely free edge at 62 and is rounded over at 64 to be pivotally attached to the longitudinal wire member 44 along the entire length of sheet metal member 60. This member is located between the wire loops 38, see Fig. 5, and of course is carried with knuckle member 32 when the latter moves. This sheet metal member closes the leg holes 30 when the seat is folded and ordinarily folds and unfolds with the knuckle member 32. However, it can be merely pivoted up to cover the leg holes 30, 30 so that packages may be placed in the infant's compartment upon the knuckle members themselves. However, the plate member of course forms a smooth comfortable seat for a child when down. When the seat is folded, the sheet metal member 60 of course goes with it and does not cause any interference at any time with any of the other parts of the device as distinct from prior art members of this nature which often stick or become stopped by engagement with portions of the rest of the device, interfering with the following action thereof.

Having thus described our invention and the advantages thereof, we do not wish to be limited to the details herein disclosed, otherwise than as set forth in the claims, but what we claim is:

1. A grocery cart having an expansible and contractible infant carrying portion and comprising a frame and an open-topped container, said container including a fixed bottom, side walls and front wall, and a swinging rear gate, means pivoting the latter between the side walls adjacent the top portion of the side walls at the rear of the container, said gate having leg openings in the upper portion thereof, an auxiliary member pivotally connected with said rear gate at the lower free end thereof, a cross member on said rear gate intermediate the ends thereof and extending laterally thereof below the level of said leg openings, a seat-forming member pivoted on said cross member, a second seat-forming member pivoted to said auxiliary member, said seat-forming members being pivoted together at their adjacent edges, and elongated means connected to one of said seat members and adapted to hold said seat members in substantially horizontal condition forming a foldable seat, said seat members being foldable upwardly to lie against the respective rear swinging member and the auxiliary member in folded condition of the auxiliary member with said rear swinging member, said auxiliary member when the articulated seat is expanded serving as a partition separating the forward portion of the container from the rear portion thereof and the upper portion being adapted to serve as a back rest for an infant seated on said articulated seat and having its legs projecting through said leg openings in the rear wall gate member, said elongated means being of sufficient length to overlap the seat member opposite to the one to which it is attached, when said seat members are expanded.

2. The grocery cart of claim 1 wherein the pivot between the adjacent seat-forming member and the rear swinging gate comprises a hook-like element forming a part of said seat-holding means, the latter extending to overlie the other seat-forming member in extended condition of the seat and the auxiliary member.

3. The grocery cart of claim 1 wherein said auxiliary member comprises a pair of spaced outer longitudinal members and a cross member located intermediate the upper and lower edges thereof, the space between the cross member and the longitudinal members being completely unimpeded and subject to loading as a part of the said container, said other seat-forming member being pivotally mounted on said cross member.

4. A grocery cart having an expansible and contractible infant carrying compartment and comprising a frame and a container thereon, said container including a swinging gate pivoted to the frame at its upper end and adapted to close a part of the wall of the container, an auxiliary gate member pivotally mounted at its lower end to the free end of said swinging gate, and articulated seat-forming members arranged between the swinging gate and the auxiliary member, said seat-forming members being pivotally connected, one to the rear gate and the other to the auxiliary member, said seat-forming members being inter-pivoted on an axis parallel to those connecting said members with the gate and its auxiliary member, said seat-forming members being foldable upwardly to provide for the auxiliary member to lie substantially flat against said swinging gate, and means carried by one of said seat-forming members and being of sufficient length to overlap the other to provide for substantially horizontal seating when said members are in extended condition, said seat-forming members being folded upon motion of siad auxiliary member toward the rear swinging gate, said swinging gate having openings above the level of the seat to allow the legs of an infant seated on said seat to project therethrough.

References Cited in the file of this patent
UNITED STATES PATENTS

| | | |
|---|---|---|
| 1,005,080 | Storm | Oct. 3, 1911 |
| 2,837,345 | Young | June 3, 1958 |
| 2,860,885 | Schweitzer | Nov. 18, 1958 |